(12) United States Patent
Varma et al.

(10) Patent No.: US 7,925,903 B2
(45) Date of Patent: Apr. 12, 2011

(54) MEDIA DEVICE POWER CONSERVATION

(75) Inventors: Ankur Varma, San Francisco, CA (US); Jeffrey Allen Andrews, Sunnyvale, CA (US); Susan Elizabeth Carrie, Mountain View, CA (US); Rune Hartung Jensen, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 913 days.

(21) Appl. No.: 11/770,041

(22) Filed: Jun. 28, 2007

(65) Prior Publication Data
US 2009/0006875 A1    Jan. 1, 2009

(51) Int. Cl.
G06F 1/32    (2006.01)
(52) U.S. Cl. ...................................................... 713/300
(58) Field of Classification Search ................... 713/300
See application file for complete search history.

(56) References Cited

U.S. PATENT DOCUMENTS

| | | | |
|---|---|---|---|
| 5,884,087 A | 3/1999 | White et al. | 395/750.02 |
| 6,408,395 B1 | 6/2002 | Sugahara et al. | 713/310 |
| 6,557,107 B1 | 4/2003 | Kim | 713/320 |
| 6,647,501 B1 | 11/2003 | Ninomiya | 713/320 |
| 6,931,555 B2 | 8/2005 | Osborn | 713/320 |
| 6,952,782 B2 * | 10/2005 | Staiger | 713/300 |
| 7,032,117 B2 | 4/2006 | Kolinummi et al. | 713/300 |
| 7,120,803 B2 | 10/2006 | Tanaka | 713/300 |
| 7,162,279 B2 | 1/2007 | Gupta | 455/574 |
| 7,171,571 B2 | 1/2007 | Starr et al. | 713/320 |
| 7,663,633 B1 * | 2/2010 | Diamond et al. | 345/503 |
| 2003/0158609 A1 | 8/2003 | Chiu | 700/22 |
| 2005/0288069 A1 | 12/2005 | Arunan et al. | 455/574 |
| 2006/0062181 A1 | 3/2006 | Chou | 370/329 |
| 2007/0049239 A1 | 3/2007 | Joung et al. | 455/343.1 |

OTHER PUBLICATIONS

Shim, H. et al., "Power Saving in Hand-Held Multimedia Systems Using MPEG-21 Digital Item Adaptation", School of Computer Science & Engineering, Seoul National University, Korea, http://cselab.snu.ac.kr, 6 pages, 2004.
"It's the Freedom to Innovate", Freescale Semiconductor, © 2007, http://www.freescale.com, 24 pages.

* cited by examiner

*Primary Examiner* — Thomas Lee
*Assistant Examiner* — Eric Chang
(74) *Attorney, Agent, or Firm* — Woodcock Washburn LLP

(57) ABSTRACT

Power is dynamically conserved in a device by analyzing past processing performance of the device and predicting the amount of power required for future execution. In an example embodiment, a video frame is analyzed to determine what portion of the video frame was needed to render data. If less than the full video frame was needed, at least one power conservation technique is applied to the device for subsequent rendering of data. Power conservation techniques include adjusting the operating frequency of circuitry utilized to render data, adjusting the voltage applied to circuitry utilized to render data, and/or turning off/on circuitry utilized to render data.

16 Claims, 4 Drawing Sheets

MEDIA DEVICE POWER CONSERVATION

TECHNICAL FIELD

The technical field relates generally to computer processing and more specifically to computer processing security.

BACKGROUND

Power consumption is becoming an area of concern for all types of devices. In the case of portable devices, because the capacity of batteries has not significantly improved, manufacturers of electronic circuits have been working toward making silicon chips and the like more power efficient. In the case of larger devices (e.g., devices that receive power via a wall outlet or the like), power consumption is a concern because of the costs associated with the use of power.

SUMMARY

This Summary is provided to introduce a selection of concepts in a simplified form that are further described below in the Detailed Description Of Illustrative Embodiments. This Summary is not intended to identify key features or essential features of the claimed subject matter, nor is it intended to be used to limit the scope of the claimed subject matter.

Power is conserved dynamically by determining processor computing performance requirements on a per frame (e.g., video frame) basis. Power conservation techniques are applied in accordance with the determined performance. In various configurations, to conserve power, power to hardware is turned off and on, applied voltage is scaled, applied frequencies are scaled, or a combination thereof. In an example embodiment, each frame is analyzed to determine the amount of data that was rendered in a respective frame and the portion of the frame utilized to render the data. A history table indicative of past per frame performance is generated and utilized to predict expected power requirements. Parameters affecting power consumption are adjusted in accordance with the predicted power requirements.

BRIEF DESCRIPTION OF THE DRAWINGS

The foregoing summary, as well as the following detailed description, is better understood when read in conjunction with the appended drawings. For the purpose of illustrating media device power conservation, there is shown in the drawings exemplary constructions thereof; however, media device power conservation is not limited to the specific methods and instrumentalities disclosed.

DETAILED DESCRIPTION OF ILLUSTRATIVE EMBODIMENTS

Figure 1:
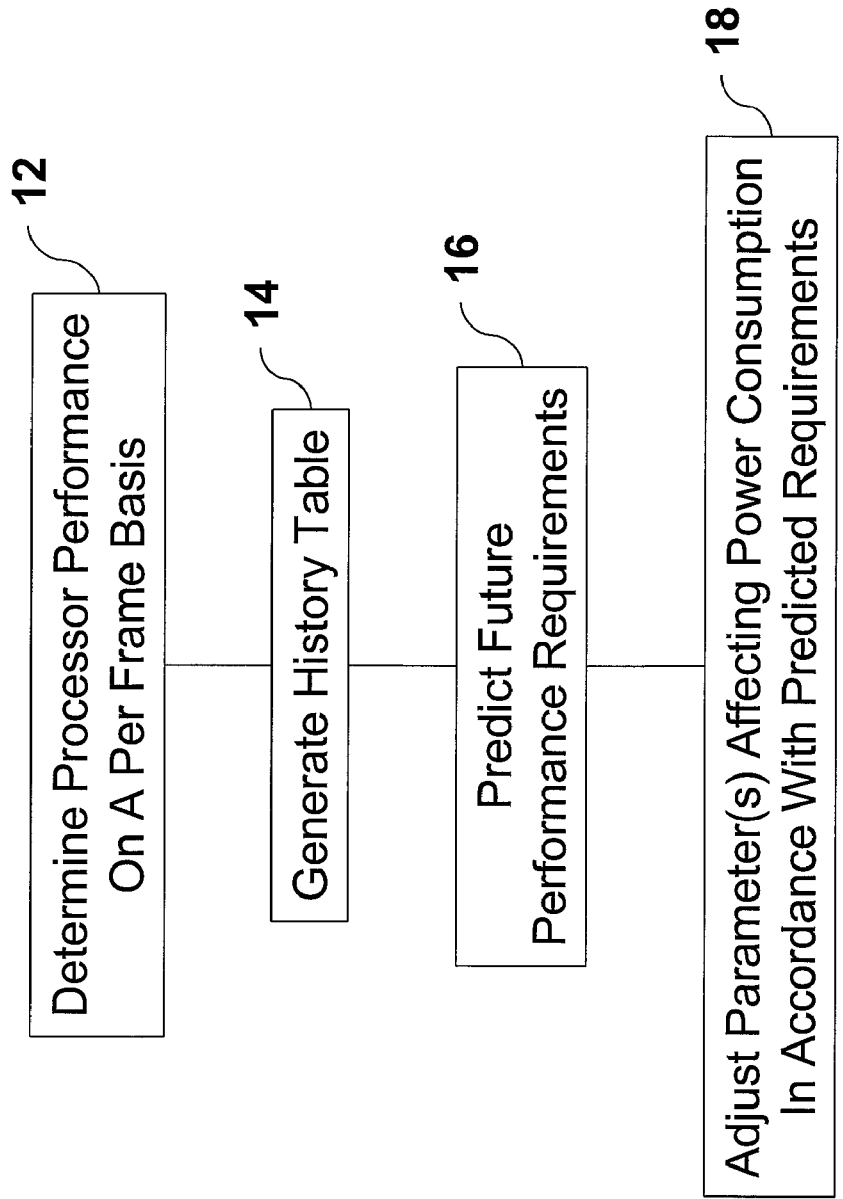
FIG. 1 is a flow diagram of an example process for conserving power.

Power conservation techniques are applied in accordance with predicted power requirements. Predicted power requirements are determined in accordance with past computing performance on a per frame basis. Power conservation as described is applicable to any appropriate device, processor, or the like. Power conservation is described herein as applied to a media device that renders video data (e.g., game console, DVD player) as an example application. It is to be understood however, that the application of power conservation as described herein is not limited thereto.

A frame can refer to an image to be rendered or a unit of time allotted to render an image. Typically, when referred to as an image, a frame is one of many images utilized to render a moving picture. Each image is rendered and persisted on a display for a given period of time, such as $1/24^{th}$ of a second, $1/30^{th}$ of a second, $1/60^{th}$ of a second, and/or $1/5^{th}$ of a second, for example, depending upon the amount of data in the image to be rendered within the given period of time. When referred to as a unit of time, a frame is the amount of time allotted to render the image, such as the times provided above, for example (e.g., $1/24^{th}$ of a second, $1/30^{th}$ of a second, $1/60^{th}$ of a second, $1/5^{th}$ of a second). A frame rate, or frequency, is the number of frames in a second. Thus, a frame size of $1/24^{th}$ of a second is equated to a 24 Hertz (Hz) frame rate. Similarly, a frame size of $1/30^{th}$ equates to a 30 Hz frame rate, a frame size of $1/60^{th}$ of a second equates to a 60 Hz frame rate, a frame size of $1/5^{th}$ equates to a 5 Hz frame rate.

The amount of data to be rendered in a video game varies through the game. For example, object deformations (e.g., opening of a door) and cloth simulations (e.g., fluttering of a character's shirt) require rendering of less data than high action scenes. The power required to render game data is often predictable to the extent that high power frames, such as frames within which high actions scenes are rendered tend to exist in groups. For example, a character may be walking down a hall way and a door may slowly open. Suddenly, a monster appears from behind the door and the character enters into a gun battle with the monster. The scenes associated with walking down the hall way and the door opening require less power than the scenes associated with the gun battle with the monster. This quasi-predictability is exploited to conserve power.

Video games are typically operated at a given frame rate, which can be inefficient because the amount of data to be rendered per frame varies. For example, each frame of a game operating at 60 Hz (60 frames per second) is approximately $1/60^{th}$ of a second, 16 milliseconds (ms). However, many frames in a game do not require the entire frame duration (16 ms) to render data. In accordance with an example embodiment of the present invention, performance is analyzed to determine what portion of a frame is needed to render data. This performance is utilized to predict the portion of the next frame needed to render data. Parameters affecting power consumption are dynamically adjusted in accordance with the predicted power requirements. Parameters are adjusted to conserve power. Example power conservation techniques include adjusting voltage applied to circuitry utilized to render data, adjusting voltage applied to circuitry utilized to render data, and turning power on/off to circuitry utilized to render data. For example, if it is predicted that less than the entire frame will be needed to render data, the operating frequency of the circuitry utilized to render data is decreased, the voltage applied to the appropriate circuitry is reduced, and/or power to appropriate circuitry is turned off. As the prediction indicates that a larger portion of the frame duration will be needed to render data, the operating frequency is increased, the voltage applied to the appropriate circuitry is increased, and/or power to the appropriated circuitry is turned on.

FIG. 1 is a flow diagram of an example process for conserving power in a media device. The performance of the processor is determined, at step 12. The performance requirement of the processor or, any logic used to implement an application inside a device (e.g., hardware for decoding audio input data, video input data, incoming traffic from a modem, or the like). The processor can include any appropriate processor. An example processor includes, but is not limited to, a general purpose processor, a desk top computer, a server, a portable entertainment device, a portable media player, e.g., a portable music player, such as an MP3 player, a walkmans, etc., a portable computing device, such as a laptop, a personal digital assistant ("PDA"), a portable phone, such as a cell phone or the like, a smart phone, a video phone, a portable email device, a thin client, a portable gaming device, etc., consumer electronic devices, such as TVs, DVD players, set top boxes, monitors, displays, etc., a public computing device, such as a kiosk, an in-store music sampling device, an automated teller machine (ATM), a cash register, etc., a navigation device whether portable or installed in-vehicle, a non-conventional computing device, such as a kitchen appliance, a motor vehicle control (e.g., steering wheel), etc., or a combination thereof, such as a game console, a DVD player, a media player, or the like.

The performance is determined on a per frame basis. In an example embodiment, the performance is determined by determining the portion of a frame duration utilized to render data. The performance information is maintained to aid in predicting future power requirements. A history table, or an equivalent thereto, is generated at step 14, for maintaining performance information. The history table is utilized to maintain any appropriate performance information, such as information pertaining to frame completion times, information pertaining to a percentage, or portion, of a frame needed to render data, information pertaining to a percentage, or portion, of a frame not needed to render data (excess frame duration), information pertaining to whether data was render within an allotted frame duration, information pertaining to a fraction of the frame time required to construct a frame (image), or a combination thereof. In an example embodiment, the history table can be utilized to record the fraction of the frame time required for constructing the frame. If exact time stamps are not available or the precision is not a concern, the history table can be utilized to record whether the frame completed within the specified frame time.

At any point in time, performance information pertaining to the previous "N" frames can be maintained in the history table. N can comprise any appropriate number of frames. N can be determined in accordance with the game title. N can be determined dynamically, changing as needed during game execution. In an example embodiment, N, can be relatively small (e.g., N=1), in anticipation that frame requirements will not vary significantly across frames.

Future performance requirements are predicted at step 16 and power affecting parameters (e.g., frequency, voltage, and turning power on/off) are accordingly adjusted at step 18. Future performance requirements are predicted in accordance with the processor performance determined for previous frames. In an example embodiment, future performance requirements are determined utilizing the history table. At a point in time, performance requirements are predicted for the next frame. Performance requirements can be predicted in any appropriate manner. For example, in a game scenario, N can be set equal to 1 and full frame times can be analyzed. Prior to rendering of the next frame, the previous frame is analyzed to determine if the frame finished on time. That is, the previous frame is analyzed to determine if all data to be rendered was rendered with the allotted frame time. If the frame did not finish on time, the performance capability of the processor can be increased at step 18 (e.g. increase frame rate, increase applied voltage). If the previous frame finished on time, compare it to its previous frame to determine if it took less or more time. If it took less time, reduce performance (step 18). If it took more time, increase or maintain performance (step 18).

In an example embodiment, performance is analyzed to generate a marker. For audio and video content, markers can be provided in the frame headers (or packet headers) that give clues for the computing requirements of the current frame. The marker is associated with a point in the frame duration. The marker is an indication when data rendering is complete. The marker is associated with the same point in the frame. Successive frame are analyzed to determine if data rendering was completed before or after the marker. Parameters affecting power consumption are adjusted accordingly. For example, if data rendering was completed before the marker, power affecting parameters can be adjusted reduce power consumption. If data rendering was completed after the marker, power affecting parameters can be adjusted increase power consumption.

In an example embodiment, hardware can predict the frame requirements based on the techniques described above. If the frames start falling behind the hardware can potentially be over-clocked to run at above normal performance level for a short duration. Once the frame rate is stable, the predictive mechanisms can be used again.

Parameters affecting power can include the dynamically powering on/off logic blocks utilized to render data, adjusting an applied voltage to logic blocks utilized to render data, and adjusting the operating frequency of logic blocks utilized to render data. A logic block can comprise any appropriate portion of circuitry. For example, a logic block can comprise a microprocessor or the like. In a system comprising multiple microprocessors utilized for rendering data, individual microprocessor can be turned on/or, voltage applied to individual microprocessors can be adjusted, and the operating frequency of individual microprocessors can be adjusted.

In an example embodiment, performance can be dynamically adjusted by utilizing multiple PLLs (phase locked loops) to generate different operating frequencies. To change a frequency, the hardware can be coupled to the appropriate PLL. While there is some time required for the PLLs to stabilize, this is usually less than powering up a PLL and logic block. Furthermore, since power is a square function of voltage, it may be advantageous to operate for a longer time at reduced voltage than operate in full on and full off modes.

In an example embodiment, an application programming interface (API) is generated to implement power conservation. The API that exposes control of power affecting parameters such that power consumption can be dynamically and intelligently regulated. An example API can program the following into hardware: UseHardwarePrediction( ) and SetHardwarePerformance(value). Wherein, UseHardwarePrediction( ) enables the use of the history table. Otherwise, the hardware will run at maximum performance level, and SetHardwarePerformance(value) sets the performance requirement for the next frame.

For applications in which audio and video frames differ significantly in behavior, frame level granularity is still applicable. This works especially well for frames that have low bit rates and hence do not require substantial processing. This is applicable to frames having low bit rates and hence do not require substantial processing. In another example embodiment, IBBBBP video frame groups can be averaged and analyzed to predict expected computational requirements.

Alternatively, each frame can be individually tracked over time in such a group and managed to the desired frame rate.

Figure 2:
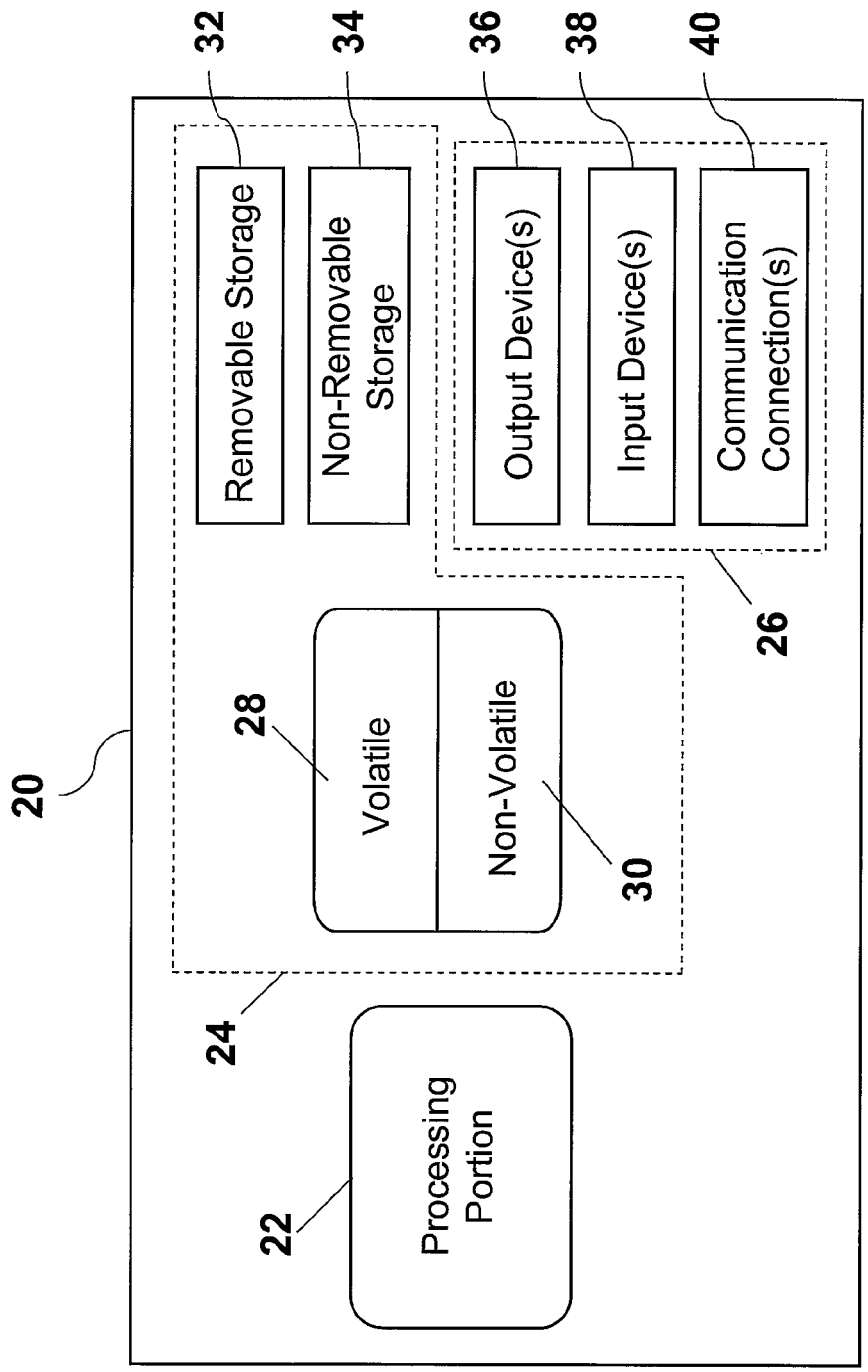
FIG. 2 a diagram of an example game console on which power conservation can be implemented.

FIG. 2 is a diagram of an exemplary processor 20 for implementing power conservation. The processor 20 comprises a processing portion 22, a memory portion 24, and an input/output portion 26. The processing portion 22, memory portion 24, and input/output portion 26 are coupled together (coupling not shown in FIG. 2) to allow communications therebetween. The input/output portion 26 is capable of providing and/or receiving components utilized to perform power conservation as described above. For example, the input/output portion 26 is capable of providing and receiving API calls.

The processing portion 22 is capable of implementing power conservation as described above. For example, the processing portion 22 is capable of determining processor performance on a per frame basis, generating a history table, predicting future performance requirements, adjusting parameters affecting power consumption, or a combination thereof.

The processor 20 can be implemented as a client processor and/or a server processor. In a basic configuration, the processor 20 can include at least one processing portion 22 and memory portion 24. The memory portion 24 can comprise the history table. The memory portion 24 can store any information utilized in conjunction with conserving power. Depending upon the exact configuration and type of processor, the memory portion 24 can be volatile (such as RAM) 28, non-volatile (such as ROM, flash memory, etc.) 30, or a combination thereof. The processor 20 can have additional features/functionality. For example, the processor 20 can include additional storage (removable storage 32 and/or non-removable storage 34) including, but not limited to, magnetic or optical disks, tape, flash, smart cards or a combination thereof. Computer storage media, such as memory portion 24, 28, 30, 32, and 34, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 20. Any such computer storage media can be part of the processor 20.

The processor 20 can also contain communications connection(s) 40 that allow the processor 20 to communicate with other devices, such as other devices, for example. Communications connection(s) 40 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. The processor 20 also can have input device(s) 38 such as keyboard, mouse, pen, voice input device, touch input device, etc. Output device(s) 36 such as a display, speakers, printer, etc. also can be included.

Figure 3:
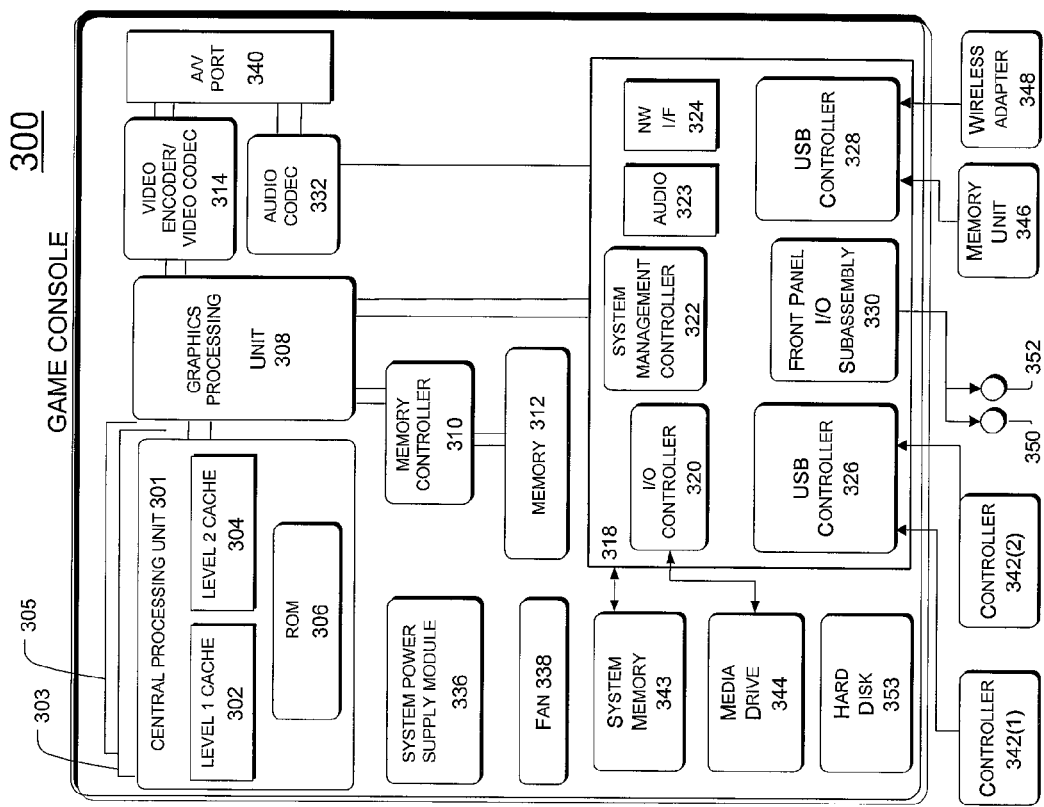
FIG. 3 is a block diagram of an example system configured to implement power conservation.

In an example scenario, the processor (e.g., processor 20) comprises a game console, such as an XBOX® game console for example. FIG. 3 is a block diagram of an example game console 300 via which power conservation can be implemented. The game console 300 along with other devices described herein, such as a display device, are capable of performing the functions needed to accomplish power conservation, as describe above. A typical game console comprises hardware and software that are specifically designed to support a core set of usage scenarios.

Game console 300 has a central processing unit (CPU) 301 having a level 1 (L1) cache 302, a level 2 (L2) cache 304, and a flash ROM (Read-only Memory) 306. The level 1 cache 302 and level 2 cache 304 temporarily store data and hence reduce the number of memory access cycles, thereby improving processing speed and throughput. The flash ROM 306 can store executable code that is loaded during an initial phase of a boot process when the game console 300 is initially powered. Alternatively, the executable code that is loaded during the initial boot phase can be stored in a FLASH memory device (not shown). Further, ROM 306 can be located separate from CPU 301. Game console 300 can, optionally, be a multi-processor system; for example game console 300 can have three processors 301, 303, and 305, where processors 303 and 305 have similar or identical components to processor 301.

A graphics processing unit (GPU) 308 and a video encoder/video codec (coder/decoder) 314 form a video processing pipeline for high speed and high resolution graphics processing. Data is carried from the graphics processing unit 308 to the video encoder/video codec 314 via a bus. The video processing pipeline outputs data to an A/V (audio/video) port 340 for transmission to a television or other display device. A memory controller 310 is connected to the GPU 308 and CPU 301 to facilitate processor access to various types of memory 312, such as, but not limited to, a RAM (Random Access Memory).

Game console 300 includes an I/O controller 320, a system management controller 322, an audio processing unit 323, a network interface controller 324, a first USB host controller 326, a second USB controller 328 and a front panel I/O subassembly 330 that may be implemented on a module 318. The USB controllers 326 and 328 serve as hosts for peripheral controllers 342(1)-842(2), a wireless adapter 348, and an external memory unit 346 (e.g., flash memory, external CD/DVD ROM drive, removable media, etc.). The network interface 324 and/or wireless adapter 348 provide access to a network (e.g., the Internet, home network, etc.) and may be any of a wide variety of various wired or wireless interface components including an Ethernet card, a modem, a Bluetooth module, a cable modem, and the like.

System memory 343 is provided to store application data that is loaded during the boot process. A media drive 344 is provided and may comprise a DVD/CD drive, hard drive, or other removable media drive, etc. The media drive 344 may be internal or external to the game console 300. When media drive 344 is a drive or reader for removable media (such as removable optical disks, or flash cartridges), then media drive 344 is an example of an interface onto which (or into which) media are mountable for reading. Application data may be accessed via the media drive 344 for execution, playback, etc. by game console 300. Media drive 344 is connected to the I/O controller 320 via a bus, such as a Serial ATA bus or other high speed connection (e.g., IEEE 3394). While media drive 344 may generally refer to various storage embodiments (e.g., hard disk, removable optical disk drive, etc.), game console 300 may specifically include a hard disk 352, which can be used to store game data, application data, or other types of data, and on which the file systems depicted in FIGS. 3 and 4 may be implemented.

The system management controller 322 provides a variety of service functions related to assuring availability of the game console 300. The audio processing unit 323 and an audio codec 332 form a corresponding audio processing pipeline with high fidelity, 3D, surround, and stereo audio processing according to aspects of the present subject matter described herein. Audio data is carried between the audio processing unit 323 and the audio codec 326 via a communication link. The audio processing pipeline outputs data to the A/V port 340 for reproduction by an external audio player or device having audio capabilities.

The front panel I/O subassembly 330 supports the functionality of the power button 350 and the eject button 352, as well as any LEDs (light emitting diodes) or other indicators exposed on the outer surface of the game console 300. A system power supply module 336 provides power to the components of the game console 300. A fan 338 cools the circuitry within the game console 300.

The CPU 301, GPU 308, memory controller 310, and various other components within the game console 300 are interconnected via one or more buses, including serial and parallel buses, a memory bus, a peripheral bus, and a processor or local bus using any of a variety of bus architectures.

When the game console 300 is powered on or rebooted, application data can be loaded from the system memory 343 into memory 312 and/or caches 302, 304 and executed on the CPU 301. The application can present a graphical user interface that provides a consistent user experience when navigating to different media types available on the game console 300. In operation, applications and/or other media contained within the media drive 344 may be launched or played from the media drive 344 to provide additional functionalities to the game console 300.

The game console 300 may be operated as a standalone system by simply connecting the system to a television or other display. In this standalone mode, the game console 300 may allow one or more users to interact with the system, watch movies, listen to music, and the like. However, with the integration of broadband connectivity made available through the network interface 324 or the wireless adapter 348, the game console 300 may further be operated as a participant in a larger network community.

Figure 4:
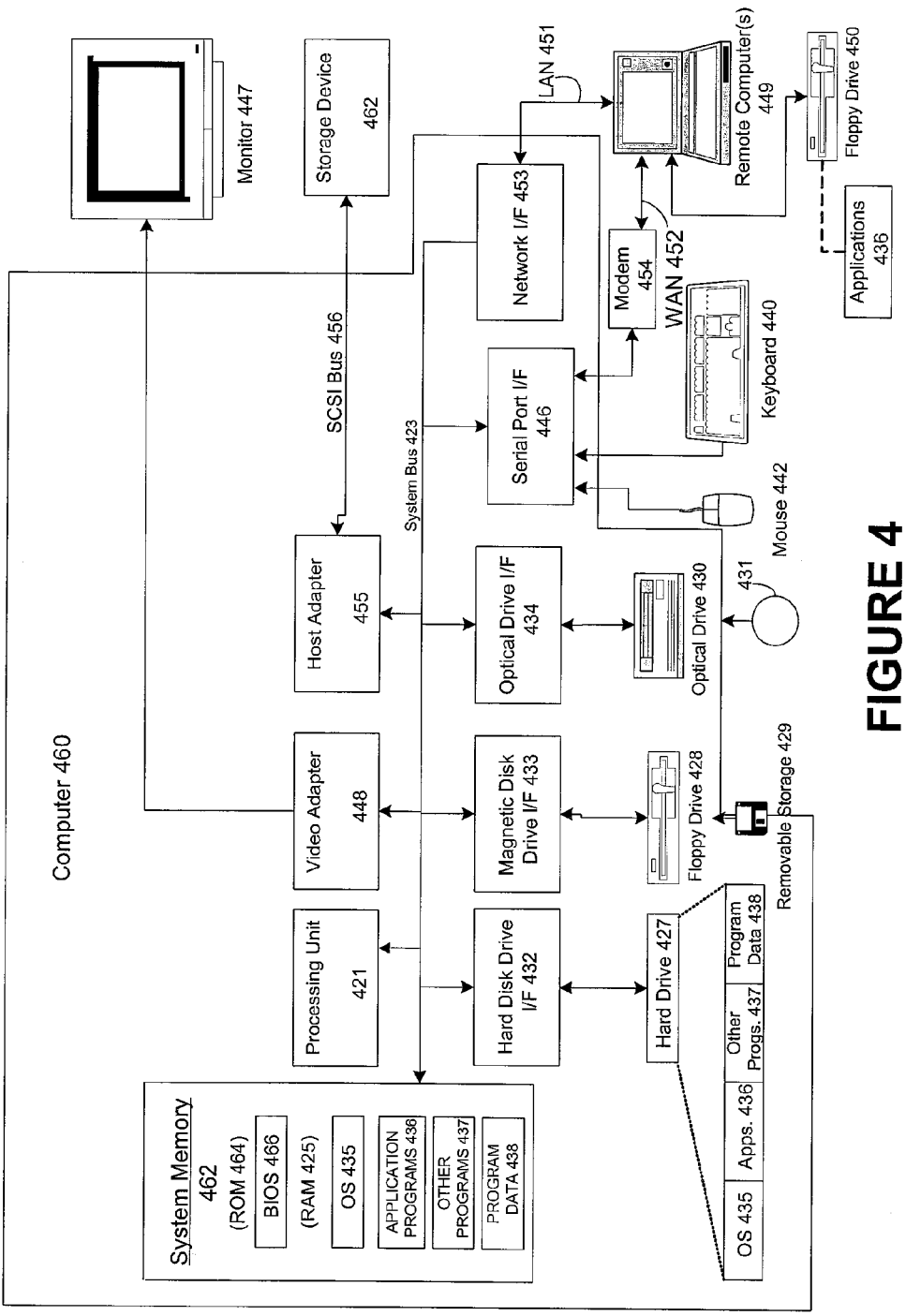
FIG. 4 is a depiction of a suitable computing environment in which media device power conservation can be implemented.

FIG. 4 and the following discussion provide a brief general description of a suitable computing environment in which power conservation can be implemented. Although not required, various aspects of power conservation can be described in the general context of computer executable instructions, such as program modules, being executed by a computer, such as a client workstation or a server. Generally, program modules include routines, programs, objects, components, data structures and the like that perform particular tasks or implement particular abstract data types. Moreover, implementations of power conservation can be practiced with other computer system configurations, including hand held devices, multi processor systems, microprocessor based or programmable consumer electronics, network PCs, mini-computers, mainframe computers, and the like. Further, power conservation also can be practiced in distributed computing environments where tasks are performed by remote processing devices that are linked through a communications network. In a distributed computing environment, program modules can be located in both local and remote memory storage devices.

A computer system can be roughly divided into three component groups: the hardware component, the hardware/software interface system component, and the applications programs component (also referred to as the "user component" or "software component"). In various embodiments of a computer system the hardware component may comprise the central processing unit (CPU) 721, the memory (both ROM 764 and RAM 725), the basic input/output system (BIOS) 766, and various input/output (I/O) devices such as a keyboard 740, a mouse 762, a monitor 747, and/or a printer (not shown), among other things. The hardware component comprises the basic physical infrastructure for the computer system.

The applications programs component comprises various software programs including but not limited to compilers, database systems, word processors, business programs, videogames, and so forth. Application programs provide the means by which computer resources are utilized to solve problems, provide solutions, and process data for various users (machines, other computer systems, and/or end-users). In an example embodiment, application programs perform the functions associated with power conservation as described above.

The hardware/software interface system component comprises (and, in some embodiments, may solely consist of) an operating system that itself comprises, in most cases, a shell and a kernel. An "operating system" (OS) is a special program that acts as an intermediary between application programs and computer hardware. The hardware/software interface system component may also comprise a virtual machine manager (VMM), a Common Language Runtime (CLR) or its functional equivalent, a Java Virtual Machine (JVM) or its functional equivalent, or other such software components in the place of or in addition to the operating system in a computer system. A purpose of a hardware/software interface system is to provide an environment in which a user can execute application programs.

The hardware/software interface system is generally loaded into a computer system at startup and thereafter manages all of the application programs in the computer system. The application programs interact with the hardware/software interface system by requesting services via an application program interface (API). Some application programs enable end-users to interact with the hardware/software interface system via a user interface such as a command language or a graphical user interface (GUI).

A hardware/software interface system traditionally performs a variety of services for applications. In a multitasking hardware/software interface system where multiple programs may be running at the same time, the hardware/software interface system determines which applications should run in what order and how much time should be allowed for each application before switching to another application for a turn. The hardware/software interface system also manages the sharing of internal memory among multiple applications, and handles input and output to and from attached hardware devices such as hard disks, printers, and dial-up ports. The hardware/software interface system also sends messages to each application (and, in certain case, to the end-user) regarding the status of operations and any errors that may have occurred. The hardware/software interface system can also offload the management of batch jobs (e.g., printing) so that the initiating application is freed from this work and can resume other processing and/or operations. On computers that can provide parallel processing, a hardware/software interface system also manages dividing a program so that it runs on more than one processor at a time.

A hardware/software interface system shell (referred to as a "shell") is an interactive end-user interface to a hardware/software interface system. (A shell may also be referred to as a "command interpreter" or, in an operating system, as an "operating system shell"). A shell is the outer layer of a hardware/software interface system that is directly accessible by application programs and/or end-users. In contrast to a shell, a kernel is a hardware/software interface system's innermost layer that interacts directly with the hardware components.

As shown in FIG. 4, an exemplary general purpose computing system includes a conventional computing device 760 or the like, including a processing unit 721, a system memory 762, and a system bus 723 that couples various system components including the system memory to the processing unit 721. The system bus 723 may be any of several types of bus structures including a memory bus or memory controller, a peripheral bus, and a local bus using any of a variety of bus architectures. The system memory includes read only memory (ROM) 764 and random access memory (RAM) 725. A basic input/output system 766 (BIOS), containing basic routines that help to transfer information between elements within the computing device 760, such as during start up, is stored in ROM 764. The computing device 760 may further include a hard disk drive 727 for reading from and writing to a hard disk (hard disk not shown), a magnetic disk drive 728 (e.g., floppy drive) for reading from or writing to a removable magnetic disk 729 (e.g., floppy disk, removal storage), and an optical disk drive 730 for reading from or writing to a removable optical disk 731 such as a CD ROM or other optical media. The hard disk drive 727, magnetic disk drive 728, and optical disk drive 730 are connected to the system bus 723 by a hard disk drive interface 732, a magnetic disk drive interface 733, and an optical drive interface 734, respectively. The drives and their associated computer readable media provide non volatile storage of computer readable instructions, data structures, program modules and other data for the computing device 760. Although the exemplary environment described herein employs a hard disk, a removable magnetic disk 729, and a removable optical disk 731, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like may also be used in the exemplary operating environment. Likewise, the exemplary environment may also include many types of monitoring devices such as heat sensors and security or fire alarm systems, and other sources of information.

A number of program modules can be stored on the hard disk, magnetic disk 729, optical disk 731, ROM 764, or RAM 725, including an operating system 735, one or more application programs 736, other program modules 737, and program data 738. A user may enter commands and information into the computing device 760 through input devices such as a keyboard 740 and pointing device 762 (e.g., mouse). Other input devices (not shown) may include a microphone, joystick, game pad, satellite disk, scanner, or the like. These and other input devices are often connected to the processing unit 721 through a serial port interface 746 that is coupled to the system bus, but may be connected by other interfaces, such as a parallel port, game port, or universal serial bus (USB). A monitor 747 or other type of display device is also connected to the system bus 723 via an interface, such as a video adapter 748. In addition to the monitor 747, computing devices typically include other peripheral output devices (not shown), such as speakers and printers. The exemplary environment of FIG. 4 also includes a host adapter 755, Small Computer System Interface (SCSI) bus 756, and an external storage device 762 connected to the SCSI bus 756.

The computing device 760 may operate in a networked environment using logical connections to one or more remote computers, such as a remote computer 749. The remote computer 749 may be another computing device (e.g., personal computer), a server, a router, a network PC, a peer device, or other common network node, and typically includes many or all of the elements described above relative to the computing device 760, although only a memory storage device 750 (floppy drive) has been illustrated in FIG. 4. The logical connections depicted in FIG. 4 include a local area network (LAN) 751 and a wide area network (WAN) 752. Such networking environments are commonplace in offices, enterprise wide computer networks, intranets and the Internet.

When used in a LAN networking environment, the computing device 760 is connected to the LAN 751 through a network interface or adapter 753. When used in a WAN networking environment, the computing device 760 can include a modem 754 or other means for establishing communications over the wide area network 752, such as the Internet. The modem 754, which may be internal or external, is connected to the system bus 723 via the serial port interface 746. In a networked environment, program modules depicted relative to the computing device 760, or portions thereof, may be stored in the remote memory storage device. It will be appreciated that the network connections shown are exemplary and other means of establishing a communications link between the computers may be used.

While it is envisioned that numerous embodiments of power conservation are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

The various techniques described herein can be implemented in connection with hardware or software or, where appropriate, with a combination of both. Thus, the methods and apparatuses for power conservation, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing power conservation.

The program(s) can be implemented in assembly or machine language, if desired. In any case, the language can be a compiled or interpreted language, and combined with hardware implementations. The methods and apparatuses for implementing power conservation also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like. When implemented on a general-purpose processor, the program code combines with the processor to provide a unique apparatus that operates to invoke the functionality of conserving power. Additionally, any storage techniques used in connection with power conservation can invariably be a combination of hardware and software.

While power conservation has been described in connection with the example embodiments of the various figures, it is to be understood that other similar embodiments can be used or modifications and additions can be made to the described embodiments for performing the same functions associated with power conservation without deviating therefrom. Therefore, power conservation as described herein should not be limited to any single embodiment, but rather should be construed in breadth and scope in accordance with the appended claims.

What is claimed:

1. A computer-implemented method for conserving power consumption of a device on a frame-by-frame basis during a multi-frame rendering of video data at a pre-defined frame repetition rate, the method comprising:
   determining an amount of data to be rendered in a first frame of the multi-frame rendering at the pre-defined frame repetition rate; and
   using information derived from the determined amount of data, for adjusting at least one parameter affecting power consumption of the device during the rendering of a subsequent frame.

2. A method in accordance with claim 1, wherein the video data is used to render a video game.

3. A method in accordance with claim 1, wherein the information derived from the determined amount of data is stored in a history table.

4. A method in accordance with claim 1, wherein
   adjusting at least one parameter affecting power consumption comprises adjusting a voltage applied to circuitry configured to render data.

5. A method in accordance with claim 1, wherein
   adjusting at least one parameter affecting power consumption comprises adjusting an operating frequency of circuitry configured to render data.

6. A method in accordance with claim 1, wherein
   adjusting at least one parameter affecting power consumption comprises one of turning on and turning off power applied to circuitry configured to render data.

7. A method in accordance with claim 1, further comprising:
   determining a processing performance during rendering of the first frame;
   determining a processing performance during rendering of the subsequent frame;
   comparing the determined processing performance during rendering of the first frame with the determined processing performance during rendering of the subsequent frame; and
   adjusting the at least one parameter in accordance with a result of the comparison.

8. A method in accordance with claim 7, further comprising:
   if the comparison is indicative of the subsequent frame requiring less power than the first frame, performing at least one of:
   reducing a voltage applied to circuitry utilized to render data;
   reducing an operating frequency of circuitry utilized to render data; and
   turning off power applied to circuitry utilized to render data.

9. A method in accordance with claim 1, further comprising:
   determining a period of time utilized to render data during the first frame;
   if the period of time utilized to render data during the first frame is less than a total amount of time allocated for the first frame based on the frame repetition rate, performing at least one of:
   reducing a voltage applied to circuitry utilized to render data;
   reducing an operating frequency of circuitry utilized to render data; and
   turning off power applied to circuitry utilized to render data; and
   if the portion of the time frame utilized to render data is greater than a total amount of time in the time frame, performing at least one of:
   increasing a voltage applied to circuitry utilized to render data;
   increasing an operating frequency of circuitry utilized to render data; and
   turning on power applied to circuitry utilized to render data.

10. A device configured to conserve power consumption on a frame-by-frame basis during a multi-frame rendering of video data at a pre-defined frame repetition rate, the device comprising:
    a processing portion configured to:
       determine a period of time utilized to render data during a first frame of the multi-frame rendering;
       compare the period of time utilized to render data during the first frame against a total amount of time allocated for the first frame, wherein the total amount of time allocated for the first frame is based on the frame repetition rate;
       predict a performance requirement based on a result of the comparison; and
       adjust at least one parameter affecting power consumption during a subsequent frame in accordance with the predicted performance requirement; and
    a memory portion configured to store information pertaining to the predicted performance requirement.

11. A device in accordance with claim 10, wherein:
    the processing portion is further configured to adjust at least one parameter affecting power consumption by performing at least one of:
    adjusting a voltage applied to circuitry configured to render data;
    adjusting an operating frequency of circuitry configured to render data;
    turning on power applied to circuitry configured to render data; and
    turning off power applied to circuitry configured to render data.

12. A device in accordance with claim 10, the processing portion further configured to:
    determine a processing performance during the first frame;
    determine a processing performance during the subsequent frame;
    compare the determined processing performance during the first frame with the determined processing performance during the subsequent frame;
    if the comparison is indicative of the subsequent frame requiring less power than the first frame, perform at least one of:

reducing a voltage applied to circuitry utilized to render data;

reducing an operating frequency of circuitry utilized to render data; and turning off power applied to circuitry utilized to render data.

13. A device in accordance with claim 10, the processing portion further configured to:

if the period of time utilized to render data during the first frame is less than the total amount of time allocated for the first frame, perform at least one of:

reducing a voltage applied to circuitry utilized to render data;

reducing an operating frequency of circuitry utilized to render data; and turning off power applied to circuitry utilized to render data; and if the period of time utilized to render data during the first frame is greater than the total amount of time allocated for the first frame, perform at least one of:

increasing a voltage applied to circuitry utilized to render data;

increasing an operating frequency of circuitry utilized to render data; and turning on power applied to circuitry utilized to render data.

14. A computer-readable medium having stored thereon computer-executable instructions for conserving power consumed by a device on a frame-by-frame basis during a multi-frame rendering of video data at a pre-defined frame repetition rate, by performing the steps of:

determining a period of time utilized by the device to render data;

if the period of time utilized to render data during a first frame is less than a total amount of time allocated for the first frame based on the frame repetition rate, performing at least one of:

reducing a voltage applied to circuitry utilized to render data;

reducing an operating frequency of circuitry utilized to render data; and turning off power applied to circuitry utilized to render data; and if the period of time utilized to render data during the first frame is greater than the total amount of time allocated for the first frame based on the frame repetition rate, performing at least one of:

increasing a voltage applied to circuitry utilized to render data;

increasing an operating frequency of circuitry utilized to render data; and turning on power applied to circuitry utilized to render data.

15. A computer-readable medium in accordance with claim 14, the computer-executable instructions further for:

determining a processing performance during the first frame;

determining a processing performance during the subsequent frame;

comparing the determined processing performance during the first frame with the determined processing performance during the subsequent frame; and adjusting at least one parameter affecting power consumption in accordance with a result of the comparison.

16. A computer-readable medium in accordance with claim 15, the computer-executable instructions further for:

if the comparison is indicative of the subsequent frame requiring less power than the first frame, performing at least one of:

reducing a voltage applied to circuitry utilized to render data;

reducing an operating frequency of circuitry utilized to render data; and turning off power applied to circuitry utilized to render data.

* * * * *